(12) United States Patent
Petricoin, Jr. et al.

(10) Patent No.: US 8,086,368 B2
(45) Date of Patent: Dec. 27, 2011

(54) VARIABLE FUNCTION COMMUNICATION GATEWAY FOR VEHICLES

(75) Inventors: Dennis Michael Petricoin, Jr., Hemlock, NY (US); David L. Anderson, Rochester, NY (US)

(73) Assignee: Bosch Security Systems Inc., Fairport, NY (US)

( * ) Notice: Subject to any disclaimer, the term of this patent is extended or adjusted under 35 U.S.C. 154(b) by 494 days.

(21) Appl. No.: 12/349,002

(22) Filed: Jan. 6, 2009

(65) Prior Publication Data

US 2010/0174439 A1    Jul. 8, 2010

(51) Int. Cl.
 *G06F 7/00* (2006.01)
(52) U.S. Cl. .................. 701/29; 701/32; 701/33
(58) Field of Classification Search .............. 701/29, 701/32, 33
See application file for complete search history.

(56) References Cited

U.S. PATENT DOCUMENTS

| | | | |
|---|---|---|---|
| 5,543,778 A | 8/1996 | Stouffer | |
| 6,161,005 A | 12/2000 | Pinzon | |
| 6,295,492 B1 * | 9/2001 | Lang et al. | 701/33 |
| 6,330,499 B1 | 12/2001 | Chou et al. | |
| 6,370,454 B1 | 4/2002 | Moore | |
| 6,380,890 B1 * | 4/2002 | Smith et al. | 342/357.31 |
| 6,429,773 B1 | 8/2002 | Schuyler | |
| 6,493,629 B1 * | 12/2002 | Van Bosch | 701/207 |
| 6,577,934 B2 * | 6/2003 | Matsunaga et al. | 701/29 |
| 6,727,811 B1 | 4/2004 | Fendis | |
| 7,081,813 B2 | 7/2006 | Winick et al. | |
| 7,102,535 B2 | 9/2006 | Otsuki et al. | |
| 7,197,364 B2 | 3/2007 | Chernoff et al. | |
| 7,245,997 B2 | 7/2007 | Kitao et al. | |
| 7,502,353 B2 * | 3/2009 | Bolz | 370/338 |
| 7,523,136 B2 | 4/2009 | Toorn | |
| 7,630,834 B2 * | 12/2009 | Klausner et al. | 701/213 |
| 7,891,004 B1 * | 2/2011 | Gelvin et al. | 726/26 |
| 2007/0167138 A1 | 7/2007 | Bauman et al. | |
| 2007/0224937 A1 | 9/2007 | Jung et al. | |
| 2007/0224938 A1 | 9/2007 | Jung et al. | |
| 2007/0224939 A1 | 9/2007 | Jung et al. | |
| 2007/0262857 A1 | 11/2007 | Jackson | |
| 2007/0265744 A1 | 11/2007 | Nicolai | |
| 2007/0279209 A1 | 12/2007 | Kogan et al. | |
| 2007/0279241 A1 | 12/2007 | Jung et al. | |
| 2007/0279283 A1 | 12/2007 | Flick | |
| 2010/0256861 A1 * | 10/2010 | Hodges | 701/33 |
| 2010/0305779 A1 * | 12/2010 | Hassan et al. | 701/2 |
| 2011/0035491 A1 * | 2/2011 | Gelvin et al. | 709/224 |
| 2011/0153149 A1 * | 6/2011 | Jeon et al. | 701/32 |

* cited by examiner

*Primary Examiner* — Drew Brown
(74) *Attorney, Agent, or Firm* — Michael Best & Friedrich LLP (57) ABSTRACT

A vehicle communication gateway configured to be located within an overland vehicle. In one embodiment, the vehicle communication gateway includes a controller; a memory connected to the controller; a short-range wireless communication interface connected to the controller; a long-range wireless communication interface connected to the controller; and an input-output module configured to connect to a CAN bus, an in-vehicle entertainment system, and a user interface. The controller is configured to receive information from the CAN bus, the in-vehicle entertainment system, and the user interface. The controller generates diagnostic messages regarding vehicle systems based on information received through the CAN bus. The controller also synchronizes files between the in-vehicle entertainment system and extra-vehicular devices, and communicates with in-building systems through the short-range wireless communication interface. Messages are sent to one or more destinations such as a vehicle manufacturer, a vehicle repair shop, and a mobile phone of a vehicle occupant through the long-range wireless communication interface.

10 Claims, 7 Drawing Sheets

VARIABLE FUNCTION COMMUNICATION GATEWAY FOR VEHICLES

BACKGROUND

Modern vehicles (mostly passenger automobiles) include devices that allow a driver or passenger to integrate his or her phone with the vehicle's electronics. For example, the Ford Motor Company offers an integrated, voice-activated, in-car communication and entertainment system for a user's mobile-phone and digital music player called "Sync." Using such systems, it is possible to place a telephone call or search through a music library (stored in a device located within the vehicle) and play a selected song or album in the vehicle using voice commands.

SUMMARY

While modern in-car telephone and entertainment systems offer hands-free control of devices and enhanced convenience, there are a number of ways in which in-vehicle systems can be improved and integrated with external systems. For example, in-vehicle systems have not, in general, been integrated with home and building systems. In addition, existing components within a vehicle have not been developed in such a way that they can provide diagnostic information to a vehicle driver or owner or allow a vehicle user to remotely control the vehicle.

In one embodiment, the invention provides a vehicle communication gateway configured to be located within an overland vehicle. In one embodiment, the communication gateway includes a controller; a memory connected to the controller; a short-range wireless communication interface connected to the controller; a long-range wireless communication interface connected to the controller; and an input-output module configured to connect to a CAN bus, an in-vehicle entertainment system, and a user interface. The controller is configured to receive information from the CAN bus, the in-vehicle entertainment system, and the user interface. The controller also generates diagnostic messages regarding vehicle systems based on information received through the CAN bus and synchronizes files between the in-vehicle entertainment system and extra-vehicular devices such as portable music players and the like. The communication gateway communicates with in-building systems through the short-range wireless communication interface, and selected destinations (such as vehicle manufacturer, repair shop, and a mobile phone of a vehicle driver or owner, etc.) through the long-range wireless interface.

In some embodiments, the controller of the communication gateway is configured to 1) receive information from a GPS and to generate messages regarding the vehicle's location; 2) to initiate a diagnostic scan of one or more vehicle systems; and 3) receive messages from one or more extra-vehicular devices and control one or more vehicle systems based on at least one message from the one or more extra-vehicular devices. The controller controls the one or more vehicle systems by generating CAN bus compliant messages.

In another embodiment, the invention provides a method of communicating between in-vehicle systems and extra-vehicular devices. The method includes communicating with one or more in-building systems through a short-range wireless communication interface; and communicating with one or more destinations through a long-range wireless communication interface. The destinations include a vehicle manufacturer IT system, a vehicle repair service provider IT system, and a mobile phone of a vehicle occupant. The method also includes receiving information from a CAN bus, an in-vehicle entertainment system, and an in-vehicle user interface; generating diagnostic messages regarding vehicle systems based on information received through the CAN bus; and synchronizing files between the in-vehicle entertainment system and extra-vehicular devices.

In some embodiments, the method includes receiving information from a GPS and generating messages regarding the vehicle's location; initiating a diagnostic scan of one or more in-vehicle systems; and receiving messages from one or more extra-vehicular devices and controlling one or more vehicle systems based on at least one message from the one or more extra-vehicular devices.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
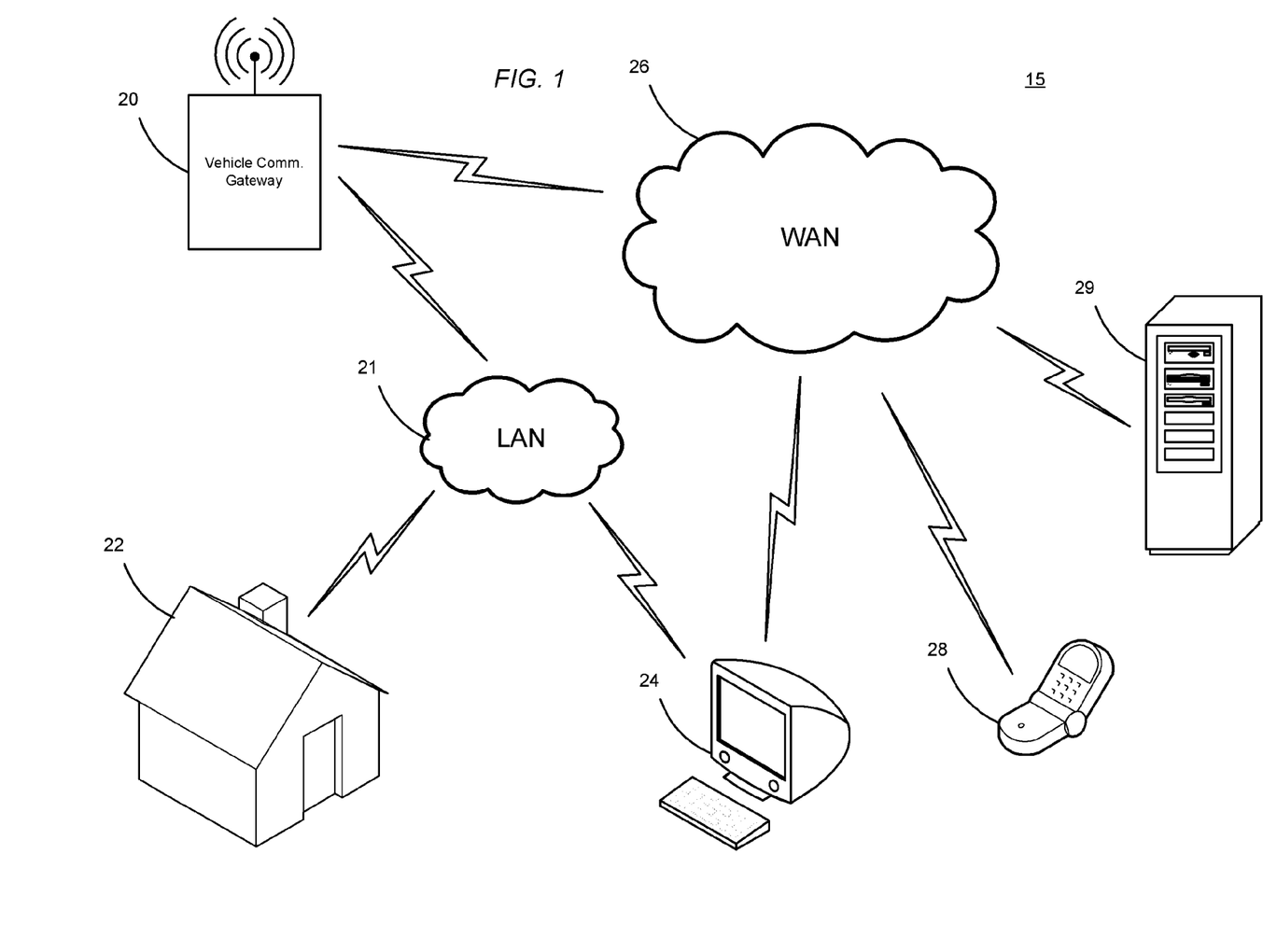
FIG. 1 is schematic representation of a system including a vehicle communication gateway that illustrates communication links between the gateway, local area networks, wide area networks, and a variety of devices including a web server, a cell or mobile phone, a personal computer, and in-building systems such as a security system.

FIG. 1 illustrates a system 15 in which a vehicle communication gateway 20 communicates with a number or other devices and networks. The vehicle communication gateway 20 may be incorporated within a vehicle's audio/video or entertainment system or may be a separate module configured to be located within the vehicle. In some embodiments, the vehicle communication gateway 20 includes a short-range communication interface. For example, a WI-FI communication interface, which in some implementations has an indoor range of approximately 120 ft. and an outdoor range of approximately 300 ft., may be used. With the short-range interface, the gateway 20 communicates through a local-area network 21 (as represented by the LAN cloud in FIG. 1) with devices and systems that are in relatively close proximity such as an in-building fire, security, or HVAC control system 22 (represented by the building illustrated in FIG. 1) or a personal computer 24 having a WI-FI communications module (not shown).

The gateway 20 also includes a second or long-range communications interface (discussed below) that permits it to communicate over longer distances. For example, a cellular telephone network or similar radio communications interface may communicate with devices that are approximately 5 to 8 miles away. With the long-range interface, the gateway 20 communicates through a wide-area network 26 (as represented by the WAN cloud in FIG. 1) with other devices such as a mobile phone 28 and a computer such as a web server 29. The devices connected to the LAN and WAN in FIG. 1 are examples, and the system 15 could include more devices, fewer devices, or devices that are not shown.

Figure 2:
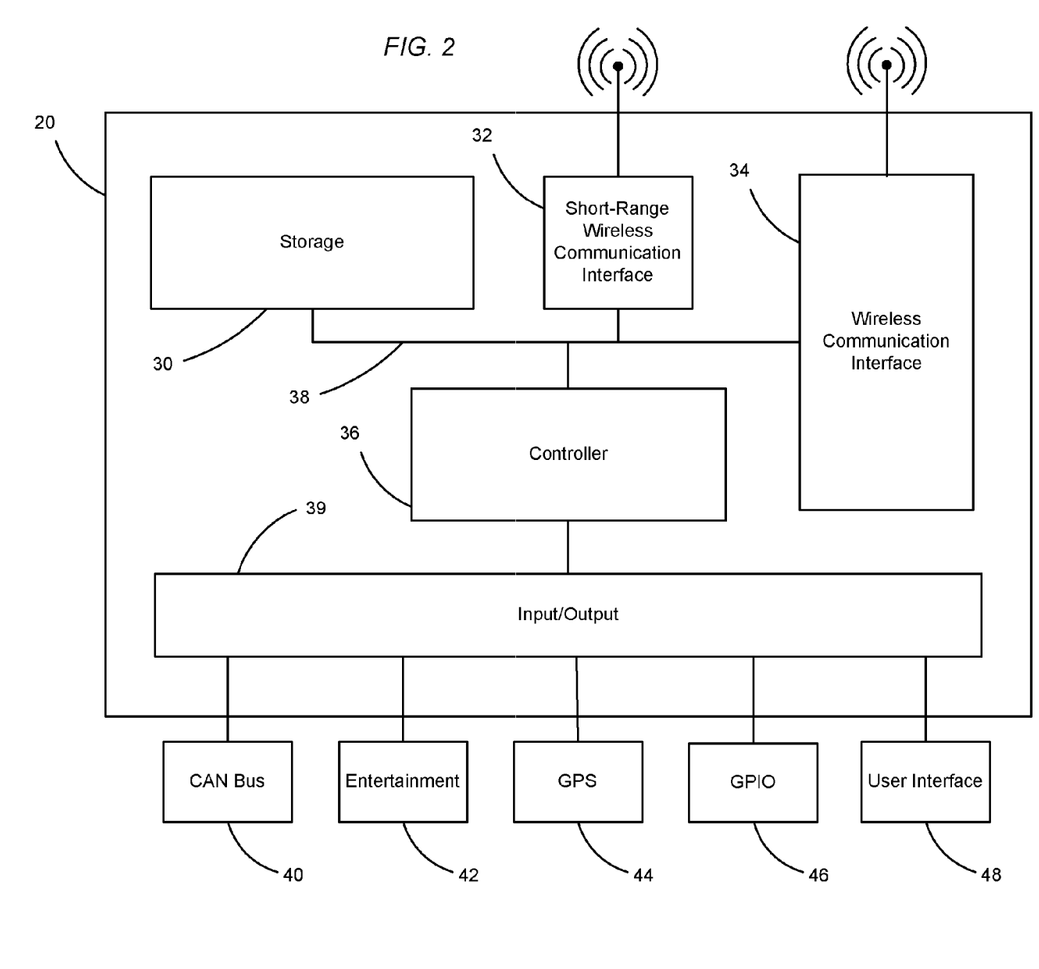
FIG. 2 illustrates the architecture of a vehicle communication gateway.

FIG. 2 illustrates the gateway 20 in greater detail. As shown in FIG. 2, the gateway includes a memory or storage 30, a short-range wireless communication interface 32, a long-range wireless communication interface 34, and a controller 36 (such as a microprocessor). A bus 38 connects the storage 30, interfaces 32, and interface 34 to the controller 36. As noted above, the short-range interface 32 could be a WI-FI or similar interface and the long-range interface 34 could be cellular telephone network interface.

The controller 36 is also connected to an input/output or I/O module 39. The I/O module 39 is connected to other devices and networks including a CAN bus 40 (through which vehicle information can be obtained and communications can occur with vehicle systems such as anti-lock braking systems, stability control systems, window and sun-roof control systems, engine control systems, and the like). The I/O module 39 is also connected to an in-vehicle audio, video, or entertainment system (represented by block 42), and a global positioning system ("GPS"). Additional or auxiliary devices (for example, an MP3 player, an iPod music player, a portable disk drive, a personal computer, etc.) can be connected to the I/O module 39 as represented by block 46 (general purpose input/output ("GPIO")). Finally, the gateway 20 includes a user interface 48 (such as a flat screen display, cursor control device, and keypad) on which a graphical user interface ("GUI") generated by the controller 36 may be displayed and through which a user may enter information and make selections presented on the GUI.

Figures 3, 4:
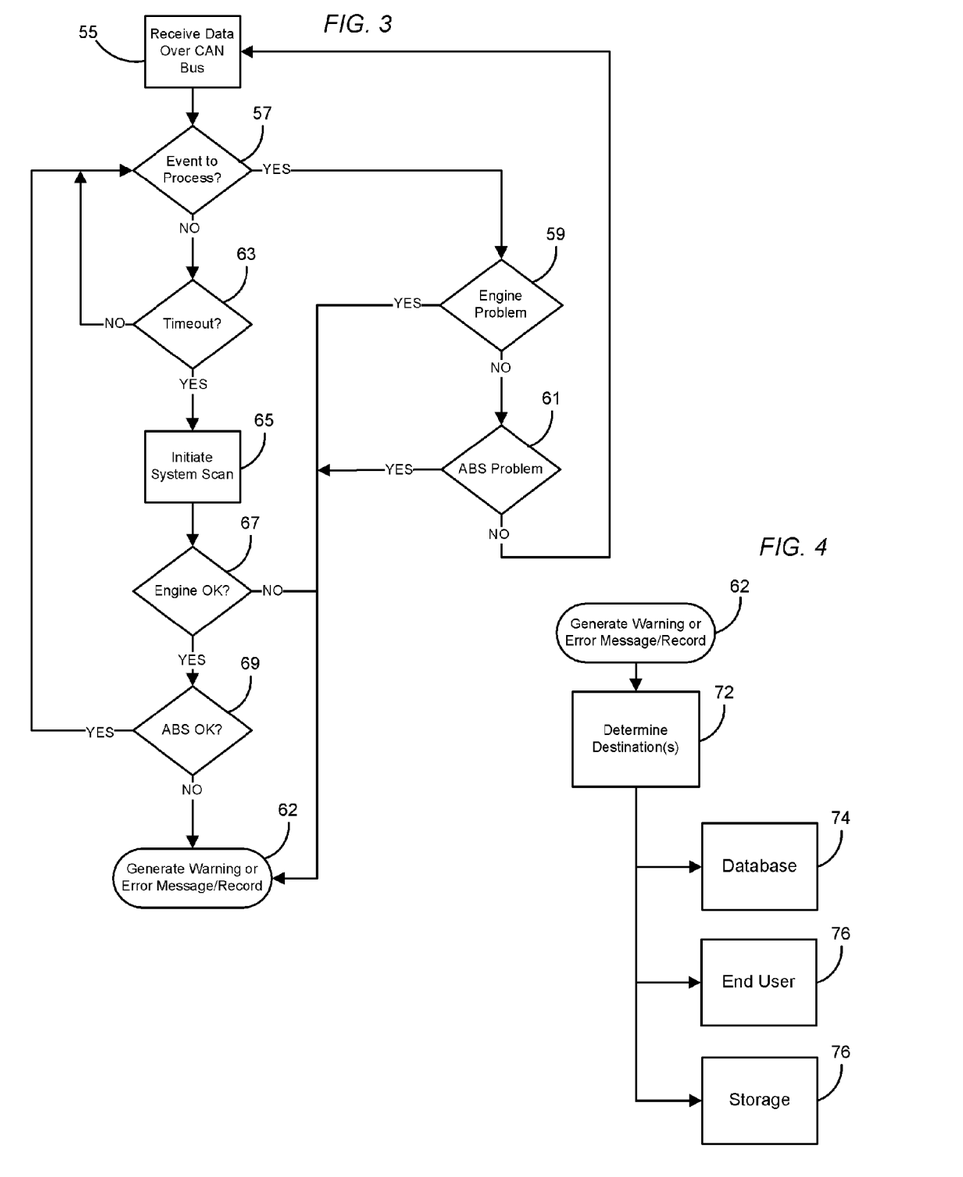
FIG. 3 is a flowchart illustrating vehicle diagnostic operations carried out by the vehicle communication gateway.
FIG. 4 is a flowchart illustrating destination options for diagnostic information determined through the process illustrated in FIG. 3.

As noted above, in certain embodiments, the gateway 20 is able to communicate with components and systems in a vehicle through a CAN bus. Nonetheless, it is possible that the gateway 20 could be connected to other types of in-vehicle buses or communication networks. A CAN bus is a broadcast type of bus, meaning that all nodes or devices connected to the bus can hear all the messages transmitted on the bus. However, most CAN devices include filters or similar devices so that a particular node or device reacts only to those messages that are of interest to the particular device. FIG. 3 is a flowchart illustrating communications between the devices connected to a CAN bus in a vehicle and the gateway 20. As shown in step 55, the gateway 20 receives information from the CAN bus. The information on the CAN bus is formatted in accordance with a CAN protocol and the controller 36 is programmed or otherwise configured to understand messages in the CAN protocol format. In the embodiment shown, the controller 36 analyzes messages or information received over the CAN bus and determines whether it should take action based upon that information, based upon the lapse of a predetermined amount of time, or both.

The CAN bus may provide information to the controller 36 such as an indication that the vehicle's engine has started, the vehicle's brakes have been applied or activated, an entertainment system has been turned on, or the like. In one embodiment, when such events occur, the controller 36 initiates or gathers diagnostic information from vehicle devices or systems. FIG. 4 illustrates a process whereby the controller determines if an event has occurred (such as the vehicle engine being started) (step 57) and the controller 36 then gathers information about the health or status of the vehicle engine (for example, by monitoring messages broadcast by the engine electronic control unit ("ECU") or by sending a message to the engine ECU requesting that the engine broadcast a diagnostic message). The controller 36 then determines whether an engine problem exists (step 59). For example, a message from the engine ECU might indicate that coolant temperate has exceeded a predetermined level. In such a case, the controller 36 generates a warning message, as is explained below. In addition to gathering diagnostic information about the vehicle's engine, the controller 36 is configured to check the health or status of the anti-lock braking system (step 61). If a problem is found, the controller generates a warning message (step 62). If no problems are found, the controller 36 continues monitoring information from the CAN bus (step 55).

The flowchart in FIG. 3 illustrates an embodiment where the controller 36 is programmed or otherwise configured to check the status of the vehicle's engine and anti-lock braking system. In other embodiments, the controller 36 could be programmed to check the status of other and additional vehicle systems.

If information obtained from the vehicle bus does not indicate that an event has occurred (step 57), the controller 36 determines whether a predetermined amount of time has lapsed (step 63), i.e., whether a timeout period has lapsed. This amount of time may be adjusted programmatically to suit the needs of a particular vehicle or application of the system 15. If a timeout period has lapsed, the controller 36 initiates a diagnostic scan of vehicle systems such as the vehicle engine and ABS, as shown in steps 65 through 69. If the scan or inquiry of a vehicle system indicates that a problem or error condition exists, then the controller generates a warning message or error record (step 62). If the timeout period has not lapsed or no error conditions are uncovered, the controller 36 continues to analyze information from the CAN bus (step 57).

As noted above, if a problem in a vehicle system or error condition is detected, a warning/error message or record is generated (step 62). The controller 36 is programmed to send the message or record to one or more destinations (step 72). These destinations can include a remote database (block 74), a mobile device (such as a mobile phone) associated with an end user (such as a vehicle driver or owner) (block 76), and a local storage (block 78). In some embodiments, the gateway 20 (and particularly, the controller 36) is configured to communicate with other devices or entities. Some alternatives are described below.

Figure 5:
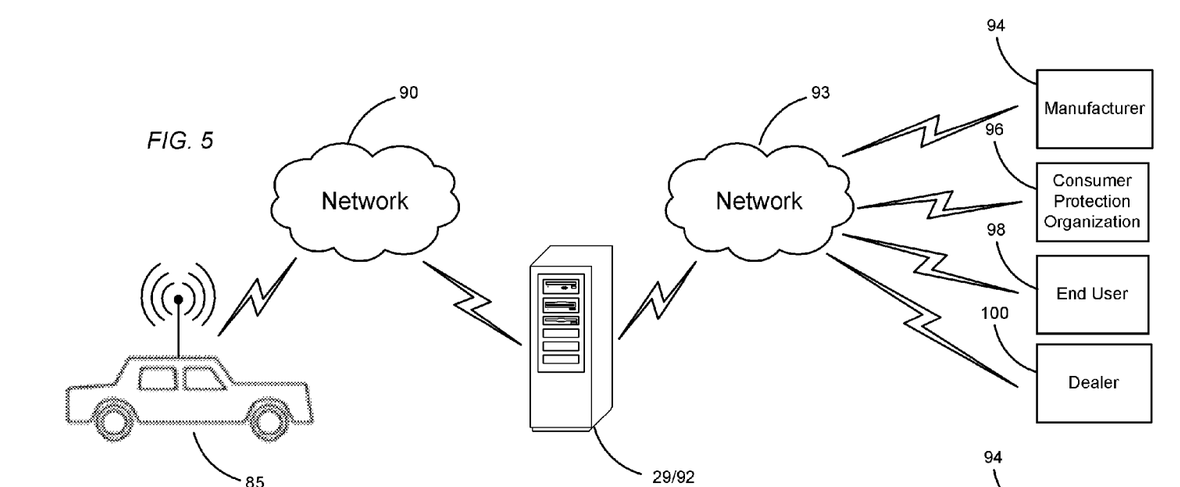
FIG. 5 illustrates the communication of information from a vehicle through multiple networks and a computer such as a router or server.
Figure 6:
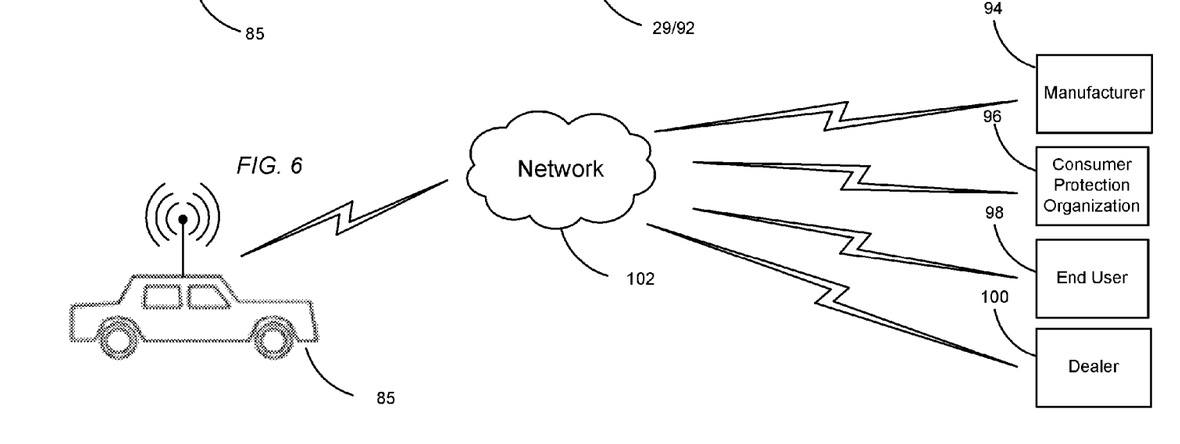
FIG. 6 illustrates the communication of information from a vehicle through a single network to a number of recipients.

FIGS. 5 and 6 illustrate how communications from an overland vehicle 85 (having a gateway 20) are processed and directed to various destinations. The vehicle 85 is illustrated as a sedan but other automobiles, trucks, and the like can be used in embodiments of the invention. In FIG. 5, communications from the vehicle 85 are directed to a first network 90 (which could be either of the networks 21 or 26). A computer 92 (e.g., a router or server) is connected to the first network 90 and a second network 93 (such as the Internet). The computer 92 may include a database in which messages and records received from the gateway 20 are stored. The information in the database is then transferred to one or more destinations such as a computer or information technology ("IT") system of the vehicle manufacturer. For example, if an in-vehicle system error is found as the result of a diagnostic scan the vehicle manufacturer can obtain information about that error as a result of transferring information from the database to the manufacturer. Information can also be transferred to other destinations such as an IT system of an industry watchdog group or consumer protection organization 96. Information may also be delivered to the vehicle owner or user 98. For example, the computer 92 generates a text message for a vehicle occupant (e.g., the owner of the vehicle) sent to the person's mobile phone indicating that the vehicle 85 needs maintenance service (e.g., an oil change). The computer 92 may also deliver information to a vehicle dealer or other provider of automobile repair services (for example, a message indicating that the dealer should schedule an appointment with the vehicle owner to perform needed maintenance services).

FIG. 6 illustrates an embodiment that lacks the computer 92 and where the vehicle 85 communicates directly to the destinations 94-100 through a single network 102. The network 102 could be a LAN, but in many implementations the network is a WAN such as the Internet.

Figure 7:
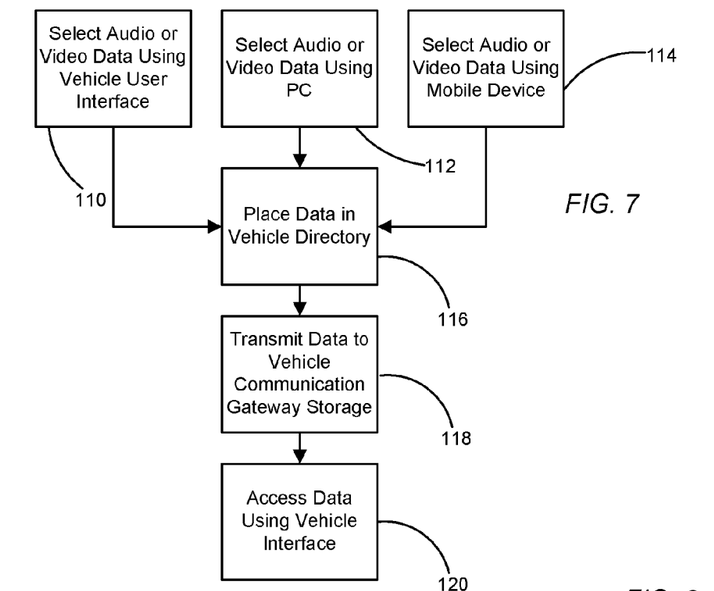
FIG. 7 illustrates a flowchart for communicating through multiple interfaces to place data in an intra-vehicle data storage.
Figure 8:
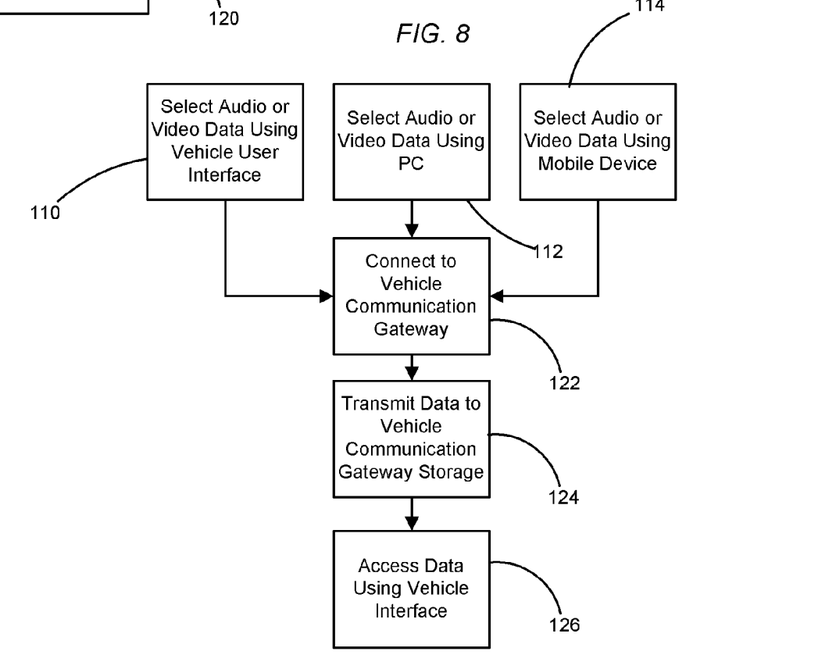
FIG. 8 illustrates a flowchart for communication through multiple interfaces and a vehicle communication gateway to place data in an intra-vehicle data storage.

FIGS. 7 and 8 illustrate processes by which information such as audio and video files are synchronized between an in-vehicle system and extra-vehicular devices and systems. As shown in FIG. 7, a person or end user may select files of interest using one of three access techniques depending on the initial location of the desired files. For example, the user can access files stored at a remote location or on a server (e.g., for a website) using the user interface 48 (as shown by block 110). The user may also access files in a computer such as the computer 24 (block 112) or in a mobile device such as the device 28 (block 114). In one embodiment, the files are placed in a vehicle directory (block 116). The files are then transferred to the internal storage 30 of the gateway 20.

FIG. 8 illustrates an embodiment where external devices (such as devices 24 and 28) connect directly to the gateway 20 (block 122) without placing files in a directory. Files are transferred from the remote devices (such as devices 24 and 28) to internal storage 30 (block 124) of the gateway 20 or from the storage 30 to the remote devices 24 and 28. Files from the remote devices that are transferred to the storage 30 are then accessible through the user interface 48 (block 120). Files can also be transferred from the storage 30 to extra-vehicular storage locations, such as a server, using the user interface 48.

Figures 9, 10:
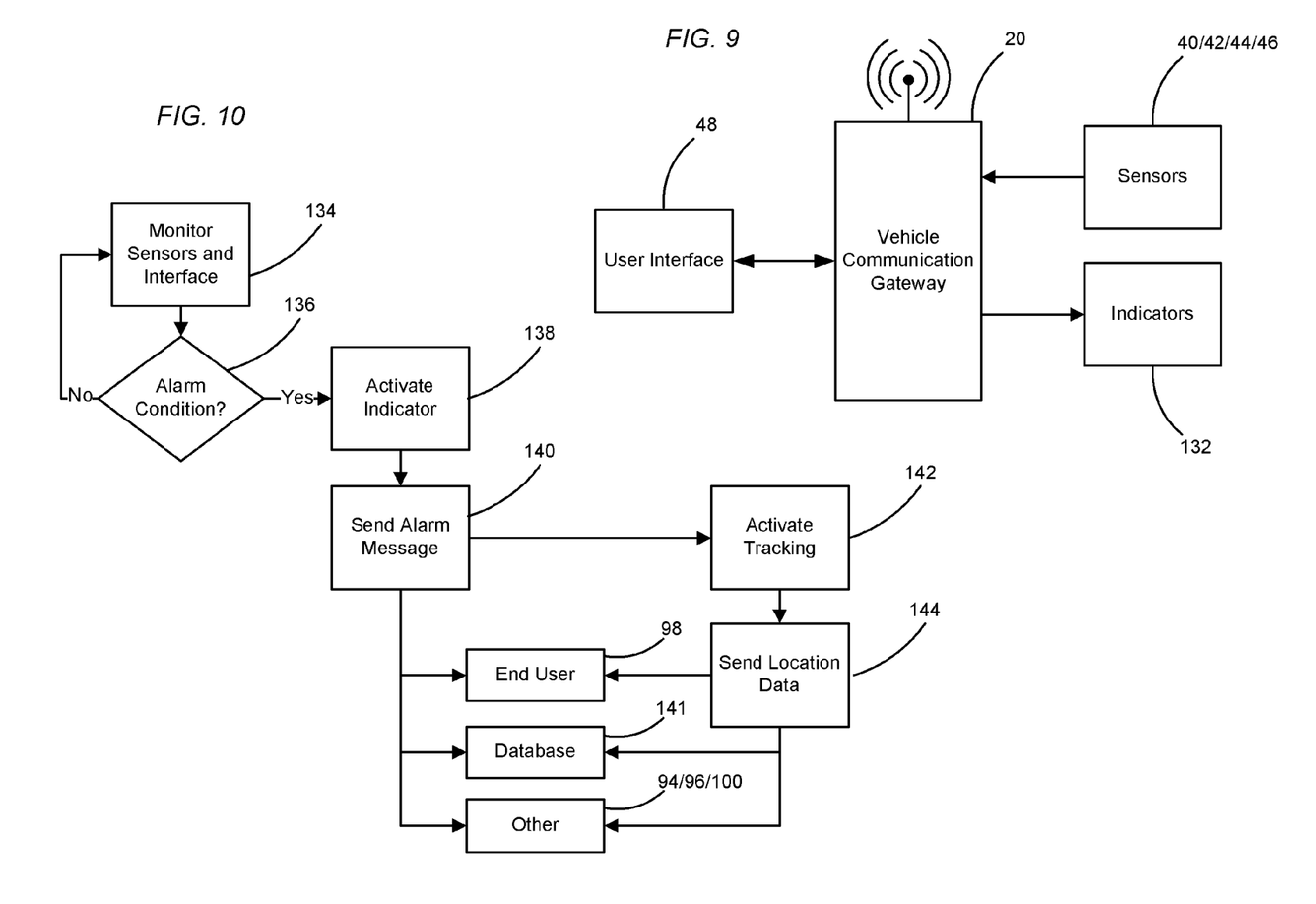
FIG. 9 illustrates the basic architecture of a vehicle communication gateway system, including sensors and a user interface for providing input information and a number of indicators for responding to output information.
FIG. 10 is a flowchart illustrating a process of monitoring alarm conditions and sending alarm messages to a destination.

FIGS. 9 and 10 provide additional information regarding the communications that were described above with respect to FIGS. 5 and 6. As noted above, the gateway 20 receives information from a variety sources which include sensors in systems connected to the CAN bus 40 and other devices and systems connected to I/O module 39. Information from these sources is used by the gateway 20 to create messages or records regarding the status of various vehicle systems. The messages generated by the gateway 20 include, in one embodiment, commands for various indicators 132, such as a command or signal that results in the sounding of an alarm, lighting of a light (e.g., a check engine light), change in operation of a vehicle system, or display of information on a monitor or display. As shown in FIG. 10, the gateway 20 monitors information provided to the I/O module 39 (block 134), and determines if an error or alarm condition exists (block 136). For example, messages sent to the gateway 20 that conform to the CAN protocol may include information having a predefined format or value that corresponds to one or more error conditions. In one embodiment, these error conditions are programmed into or stored in the gateway 20 and incoming messages are analyzed to determine if they contain one or more predefined codes corresponding to an error or alarm condition. If an alarm condition exists, the gateway 20 activates an indicator (for example, a warning light or audible alarm) (step 138) and generates an alarm message or record (step 140). The alarm record may be delivered to one or more destinations such as the vehicle owner or other end user 98, a database 141 (such as one stored internally within the gateway 20 of vehicle 85 or a database connected to or integrated with the computer 92), or other destinations (such as those shown in FIGS. 5 and 6). In some embodiments, the gateway 20 is also configured to track the vehicle's location in addition to transmitting information about an error or alarm condition. When an alarm condition is detected, tracking (through, for example, the GPS 44) is activated (block 142) and information regarding the vehicle's location is transmitted (block 144) to the one or more end destinations. Location information may be sent along with error condition information or separately from such information.

Figure 11:
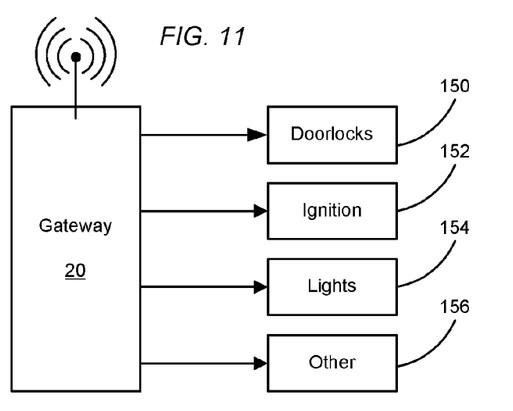
FIG. 11 is a schematic diagram of a communication gateway communicating with vehicle components to control those components.
Figure 12:
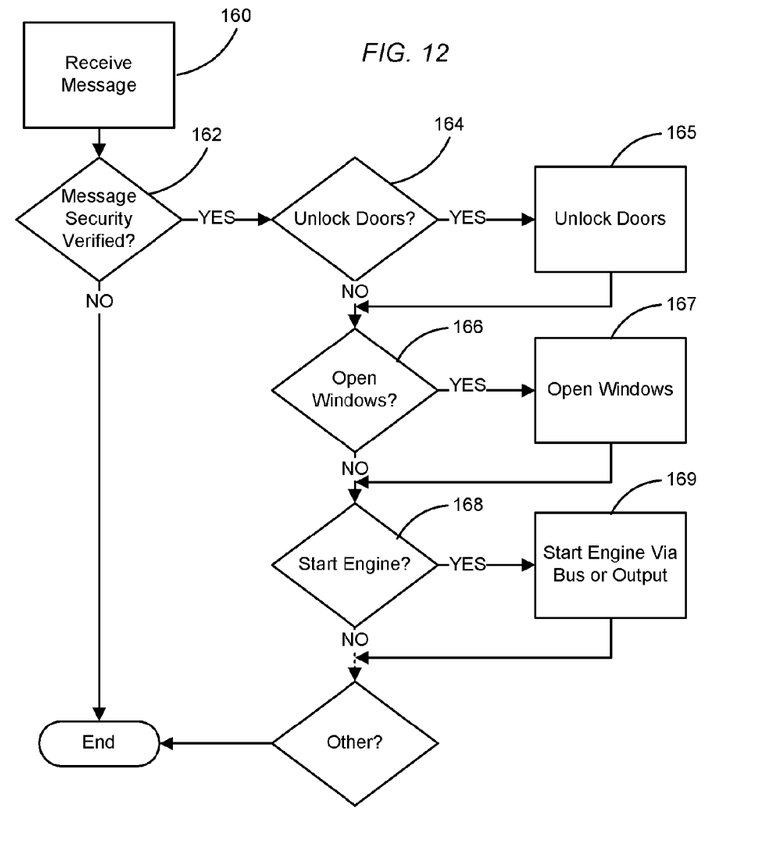
FIG. 12 is a flowchart of remote control operations performed through the communication gateway.

FIGS. 11 and 12 illustrate an embodiment where the gateway 20 can be implemented as a remote control system for a vehicle. Remote-control functionality and features may be provided in combination with other functionality and features described above. In the embodiment shown, the gateway 20 receives commands from remote devices such as the computer 24 or mobile phone 28. These commands can include instructions to lock or unlock the vehicle's doors (block 150), start or stop the vehicle's engine (block 152), turn lights of the vehicle on or off (block 154), and other commands (block 156). As shown in FIG. 12, the gateway 20 implements a process where the gateway receives messages from devices (such as devices 24 and 28) (step 160) and verifies that the command it receives is from an authorized source (step 162). The gateway 20 then processes the command by opening or locking the doors, opening or closing windows, starting or stopping the engine, or carrying out other remote operations as shown in steps 164 through 169.

Various features and advantages of the invention are set forth in the following claims.

What is claimed is:

1. A vehicle communication gateway configured to be located within an overland vehicle, the vehicle communication gateway comprising:
    a controller;
    a memory connected to the controller;
    a short-range wireless communication interface connected to the controller;
    a long-range wireless communication interface connected to the controller; and
    an input-output module configured to connect to a CAN bus, an in-vehicle entertainment system, and a user interface,
    wherein the controller is configured to receive information from the CAN bus, the in-vehicle entertainment system, and the user interface; to generate diagnostic messages regarding vehicle systems based on information received through the CAN bus; to synchronize files between the in-vehicle entertainment system and extra-vehicular devices; to communicate with in-building systems through the short-range wireless communication interface; and to communicate with at least one destination selected from the group of a vehicle manufacturer IT system, a vehicle repair service provider IT system, and a mobile phone of a vehicle occupant through the long-range wireless communication interface.

2. A vehicle communication gateway of claim 1, wherein the controller is further configured to receive information from a GPS and to generate messages regarding the vehicle's location.

3. A vehicle communication gateway of claim 1, wherein the controller is further configured to initiate a diagnostic scan of one or more in-vehicle systems.

4. A vehicle communication gateway of claim 1, wherein the controller is further configured to receive at least one message from one or more extra-vehicular devices and control one or more vehicle systems based on the at least one message from the one or more extra-vehicular devices.

5. A vehicle communication gateway of claim 4, wherein the controller controls the one or more vehicle systems by generating CAN bus compliant messages.

6. A method of communicating between vehicle systems and extra-vehicular devices, the method comprising:

communicating with one or more in-building systems through a short-range wireless communication interface;

communicating with at least one destination selected from the group of a vehicle manufacturer IT system, a vehicle repair service provider IT system, and a mobile phone through a long-range wireless communication system;

receiving information from a CAN bus, a vehicle entertainment system, and an in-vehicle user interface;

generating diagnostic messages regarding vehicle systems based on information received through the CAN bus; and synchronizing files between the in-vehicle entertainment system and extra-vehicular devices.

7. A method of claim 6, further comprising receiving information from a GPS and generating messages regarding the vehicle's location.

8. A method of claim 6, further comprising initiating a diagnostic scan of one or more in-vehicle systems.

9. A method of claim 6, further comprising receiving at least one message from one or more extra-vehicular devices and controlling one or more vehicle systems based on the at least one message from the one or more extra-vehicular devices.

10. A method of claim 9, wherein controlling the one or more vehicle systems includes generating CAN bus compliant messages.

* * * * *